United States Patent [19]

Plourde

[11] Patent Number: 4,464,256
[45] Date of Patent: Aug. 7, 1984

[54] LIQUID SETTLING AND RECYCLING MACHINE

[76] Inventor: Gérard Plourde, 2755 des Grands Coteaux, Beloeil, Canada, J3G 2C9

[21] Appl. No.: 469,154

[22] Filed: Feb. 24, 1983

[51] Int. Cl.³ .......................................... B01D 21/00
[52] U.S. Cl. .................................. 210/149; 210/167; 210/223; 210/232; 210/305; 210/307
[58] Field of Search ............. 210/149, 167, 304, 305, 210/307, 312, 223, 232; 134/111

[56] References Cited

U.S. PATENT DOCUMENTS

| | | | |
|---|---|---|---|
| 269,388 | 11/1854 | Schoenfeld | 210/523 |
| 569,016 | 7/1896 | Darrow . | |
| 590,535 | 9/1897 | Arbuckle . | |
| 1,002,792 | 9/1911 | Weitzenhoffra | 210/312 |
| 1,987,649 | 1/1935 | Wertz | 134/111 |
| 2,197,787 | 4/1940 | Chadwick | 210/312 |
| 2,352,356 | 6/1944 | Albertson . | |
| 2,422,464 | 6/1947 | Bartholomew | 210/781 |
| 2,624,463 | 1/1953 | Freese | 210/311 |
| 2,675,012 | 4/1954 | Scales | 210/167 |
| 2,917,178 | 12/1959 | Unthank et al. | 210/305 |
| 2,922,173 | 1/1960 | Lind et al. | 15/3 |
| 3,227,167 | 1/1966 | Parent | 134/111 |
| 3,239,066 | 3/1966 | Schick | 210/519 |
| 3,362,542 | 1/1968 | Stevens | 210/521 |
| 3,433,555 | 3/1969 | Kasner | 134/111 |
| 3,517,815 | 6/1970 | Bolton et al. | 210/256 |
| 3,707,404 | 12/1972 | Carlson et al. | 134/10 |
| 3,834,530 | 9/1974 | Thompson | 210/223 |
| 3,890,988 | 6/1975 | Lee | 210/167 |
| 3,921,653 | 11/1975 | Ducharme | 134/111 |
| 4,029,115 | 6/1977 | Wheeler | 134/111 |
| 4,051,858 | 10/1977 | Mele | 134/111 |
| 4,105,342 | 9/1978 | Plourde | 134/111 |
| 4,133,771 | 1/1979 | Pielkenrood | 210/513 |

Primary Examiner—John Adee

[57] ABSTRACT

A liquid settling and recycling machine particularly conceived for use to wash or clean greasy or oily parts in a garage or mechanical shop; this machine being characterized by an improved wandering flow path featuring a first settling stage adapted for rapid and early collection of metal particles including a collector device readily removable for emptying, magnets to rapidly collect metal particles, and a temperature responsive cover carrier and cover adapted to close a drain giving access to an underlying reservoir of flammable solvent to protect the latter against fire in it upon the start of a fire outside of the reservoir.

6 Claims, 3 Drawing Figures

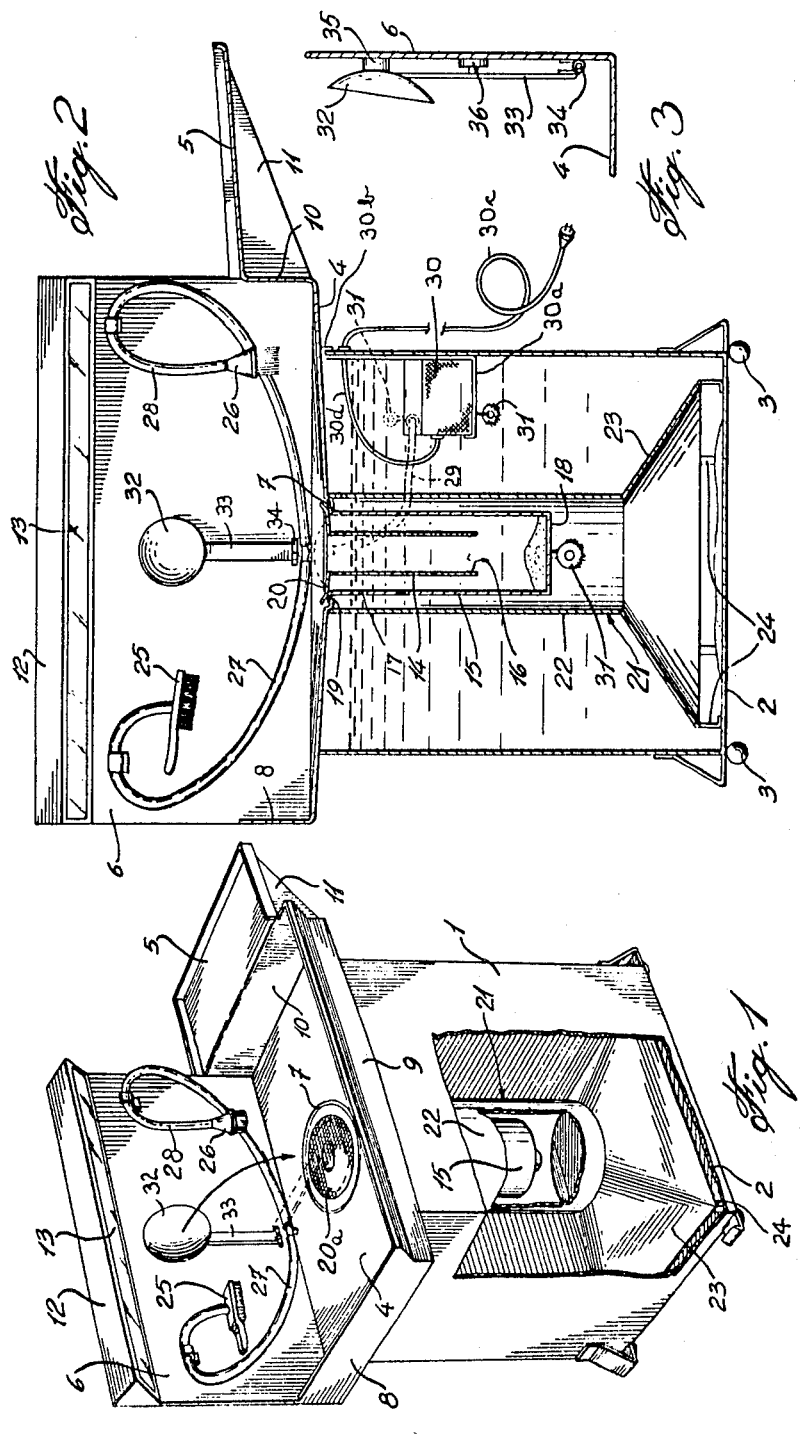

LIQUID SETTLING AND RECYCLING MACHINE

FIELD OF THE INVENTION

This invention relates to a machine for settling and recycling a liquid and, in particular, to a machine of the type adapted to clean or wash mechanical parts like machine or vehicle parts in a maintenance shop or garage.

BACKGROUND OF THE INVENTION

In the normal course of mechanical repair in garages or mechanical shops, parts are often cleaned or washed in a solvent such as varsol or gasoline, using readily available containers without any filtering of the used solvent. In such cases, the solvent rapidly becomes so much soiled with grease, oil, metal particles, and the like that it has to be often replaced by a fresh supply. Machines of the above type have so far been proposed but they are not found having a sufficient purifying efficiency and the user still finds desirable to replace the solvent quite often. The cost, time, and other inconvenience of such replacement prevent the acceptance of the anteriorly proposed machines.

In U.S. Pat. No. 4,105,342 dated Aug. 8, 1978, inventor Aime Plourde, a machine of the above type and adapted to avoid the above mentioned disadvantages is described. The applicants have found that this patented machine, although satisfactory for mot users, can still be improved safety wise and efficiency wise to satisfy users more particularly concerned with more safety and a high rate of settling as reuired for more regular use.

SUMMARY OF THE INVENTION

It is a general object of the present invention to provide a liquid settling and recycling machine of the above type that is adapted to avoid the above mentioned disadvantages.

It is a more particular general object of the present invention to provide a liquid settling and recycling machine of the above type that is particularly adapted to produce a high rate of settling of particles carried by the liquid and a high rate of recycling for a relatively more regular use.

It is another more particular general object of the present invention to provide a liquid settling and recycling machine of the above type that is particularly adapted to provide safety against fire catching into the liquid solvent used therein.

It is a more specific object of the present invention to provide a liquid settling and recycling machine of the above type that provides an efficient up and down wandering flow path particularly adapted to enhance rapid and early settling down of particles carried by the liquid for a high rate of settling and recycling of the liquid.

It is another object of the present invention to provide a liquid settling and recycling machine of the above type that is adapted to magnetically and rapidly remove metal particles carried by the liquid to rapidly thin the particles in suspension in the liquid.

It is still another object of the present invention to provide a liquid settling and recycling machine of the above type that provides a two-stage settling system and process wherein the first stage is adapted to catch a good share of particles in the liquid and features readily removable members to rapidly clean the latter even without disturbing the remainder of the machine.

It is a still further object of the present invention to provide a liquid settling and recycling machine of the above type that particularly features a temperature responsive cover adapted to close a drain that gives access to an underlying reservoir of flammable solvent to protect the latter against fire.

BRIEF DESCRIPTION OF THE DRAWINGS

The above and other objects and advantages of the present invention will be better understood with reference to the following detailed description of a preferred embodiment thereof which is illustrated, by way of example, in the accompanying drawings, in which:

FIG. 1 is a perspective view of a liquid settling and recycling machine according to the present invention;

FIG. 2 is a cross-sectional elevation view of the machine of FIG. 1; and

FIG. 3 is a detailed elevation view particularly illustrating a cover and associated carrier to selectively close a drain of the machine.

The illustrated liquid settling and recycling machine comprises a rectangular bottom housing portion 1 forming a liquid reservoir. The reservoir or bottom housing portion 1 includes a flat bottom 2 mounted at the corners on spherical legs or supports 3. A top housing portion is removably mounted on the top of the reservoir 1 and includes a pan 4, a shelf 5, and a back splash panel 6.

The pan 4 has a centrally depressed bottom formed with a drain aperture 7 at the lowermost point thereof. The pan 4 is formed with a left side 8, a front 9, a right side 10, and a rear wall projecting higher than the lateral sides and the front and defining the back splash panel 6. The right side 10 outwardly projects to form the shelf 5 reinforced by brackets 11. At the top of the back splash panel 6, there is formed a fluorescent light housing 12 with a forwardly and downwardly inclined window 13 to illuminate the parts being washed or cleaned in the pan 4.

Inside the reservoir 1, there is provided a two-stage liquid settling installation arranged for up and down wandering flow of the liquid adapted to enhance settling of liquid carried particles. The first stage of settling is produced through a pair of coaxial inner and outer tubular devices 14 and 15 respectively. The tubular device 14 defines an upstream member of cylindrical construction having a fully open lower end 16 and a cylindrical side wall.

The tubular device 15 is also of cylindrical construction and includes a closed bottom 18 thereby defining a sediment collector. The upper end of the sediment collector tubular device 15 is formed with an outer circumferential flange 19 removably seating or resting on the flange defined by the circumferential edge around the drain aperture 7. The sediment collector tube 15 is provided with a single aperture 17, about ¾" in diameter, and located just below the normal liquid level in reservoir 1, to allow outward flow therethrough. The upstream tubular device 15 includes an outer circumferential flange 20 at the upper end thereof adapted to removably seat on the upper flange 19 of the sediment collector tube 15. The upper end of the upstream tubular device 14 is opened and arranged for drainage of the pan 4 therein. A screen 20a for retaining coarse particles removably covers drain aperture 7.

A downstream tubular device 21 is engaged around the devices 14 and 15 and includes a major upper cylindrical portion 22 and a lower downwardly flared portion 23. The larger end of the flared portion 23 terminates adjacent but spaced from the bottom of the reservoir and is so held by fixed brackets 24. The cylindrical portion 22 and devices 14 and 15 are coaxially mounted one inside the other and cooperatively define an up and down wandering flow path extending upstream to downstream in a first settling stage downstream from the drain through the tubular device 14 and thereafter upstream into the tubular device 15 around the tubular device 14 to outwardly flow through the aperture 17 at the upper end of the cylindrical side wall of the tubular device 15. Heavier sediments are thus induced to settle on the bottom 18 of the sediment collector tube 15. Whenever required or desired, the latter may be removed upwardly through the drain aperture 7 to be emptied.

A second stage of settling is produced by downward flow between the tubular devices 15 and 22, outwardly under the lower edge of the flared portion 23, and then upwardly. This induces settling on the bottom 2 of the reservoir 1.

A pair of brushes 25 and 26, whose detailed construction does not form part of the present invention, are connected to liquid supply tubes or hoses 27 and 28 respectively. The brush 25 is a hard brush such as for instance a steel brush while the brush 26 is a soft brush. The tubes 27 and 28 are connected to the outlet tube 29 of a pump 30 submerged, together with its inlet, in the reservoir 1 near the top of the liquid. Pump 30 is fixedly supported by a bracket 30a, the longer side of which extends along a side wall of reservoir 1 and forms an inverted U shaped hook 30b at its upper end to removably suspend the bracket 30 from the top edge of reservoir 1. The supply cord 30c of pump 30 extends through a protecting tube 30d which is attached to pump 30 and is removably fixed within a notch at the top edge of reservoir 1. Permanent magnets 31 are preferably strategically located and attached to the submerged structure to magnetically attach and remove metal particles carried by the liquid.

A cover 32 is fixedly secured to one end of a carrier arm 33 that is freely pivoted by a hinge 34 secured to the back panel 6. A permanent magnet 35 is secured to back panel 6 and operatively positioned to magnetically bias the cover 32 and the arm 33 in inoperative position against the back panel 6. The magnet 35 includes a fusible carrier material that fuses above a predetermined temperature. The latter being such that when there is a fire in the vicinity or in the pan 4, the cover 32 and arm 33 will be released to allow the cover to fall under gravity to the right position of registry with the drain aperture to close access to the reservoir by that drain aperture. A push-button switch 36 is secured to the back panel 6 to be engaged by the arm 33 and to close the circuit activating the pump and to interrupt the pump upon release of the cover 32 by the magnet 35.

What I claim is:

1. A liquid settling and recycling machine comprising, in combination, a reservoir for holding a liquid, a pan positioned above the reservoir and having a drain aperture, an upstream tubular device having an upper end and a lower end with the upper end being operatively associated to the drain aperture for drainage of the pan therein, and the lower end forming liquid outlet means, a tubular sediment collector device having a closed lower end portion and an apertured upper end portion, said collector device spacedly surrounding said upstream tubular device, said closed lower end portion forming a sediment holder underlying the outlet means of the upstream tubular device, and said apertured upper end portion forming an outward discharge for said liquid, a downstream tubular device spacedly surrounding said collector device and having an upper end and a lower end, said upper end of the downstream tubular device operatively communicating with the apertured upper end portion for discharge from the latter therein and said lower end of the downstream tubular device opening into said reservoir adjacent the bottom thereof for discharge of the liquid therethrough, and a liquid circulation pump having an inlet submerged in the reservoir outwardly of said devices, and an outlet for discharge into said pan, whereby the liquid drainage from said drain goes through a downward and upward wandering flow through said devices and the reservoir for recycling by the pump the upstream tubular device and the tubular sediment collector device being separable from each other and removable upwardly through said drain aperture for emptying of the sediment holder.

2. A liquid settling and recycling machine as defined in claim 1, wherein both of the upstream tubular device and the tubular sediment collector device are suspended from said pan in registry with the drain aperture.

3. A liquid settling and recycling machine as defined in claim 2, wherein the upstream tubular device and the tubular sediment collector device are of symmetrical construction with the upstream tubular device extending coaxially inside and relative to the tubular sediment collector device, each of the upstream tubular device and the tubular sediment collector device includes an annular outer flange around the upper end thereof removably supporting the collector device on the edge around said drain aperture and the upstream tubular device on the flange of the collector device, respectively.

4. A liquid settling and recycling machine as defined in claim 3, wherein said downstream tubular device includes a major upper portion and a lower portion, said major upper portion is of cylindrical construction coaxially engaged around the tubular sediment collector device and said lower portion is downwardly flaring and operatively ends close to the bottom of the reservoir for settling of liquid-carried particles to the bottom of the reservoir.

5. A liquid settling and recycling machine as defined in claim 4, further including permanent magnets submerged into the reservoir and arranged for clinging of metal particles thereto upon circulation in the reservoir of a liquid with metal particles in suspension therein.

6. A liquid settling and recycling machine as defined in claim 4, further including a fire-proof cover for said drain aperture, an arm carrying said cover at one end, freely pivoted at the other end remote from the drain, and constructed and arranged for falling under gravity with operative closing registry of the cover over the drain aperture, and a permanent magnet and a fusible magnet carrier operatively holding said arm and cover magnetically biased in open position away from said drain opening said magnet carrier fusible under heat to allow tight closing of the drain aperture by said cover under gravity, thereby protecting a flammable solvent in the reservoir against fire.

* * * * *